UNITED STATES PATENT OFFICE.

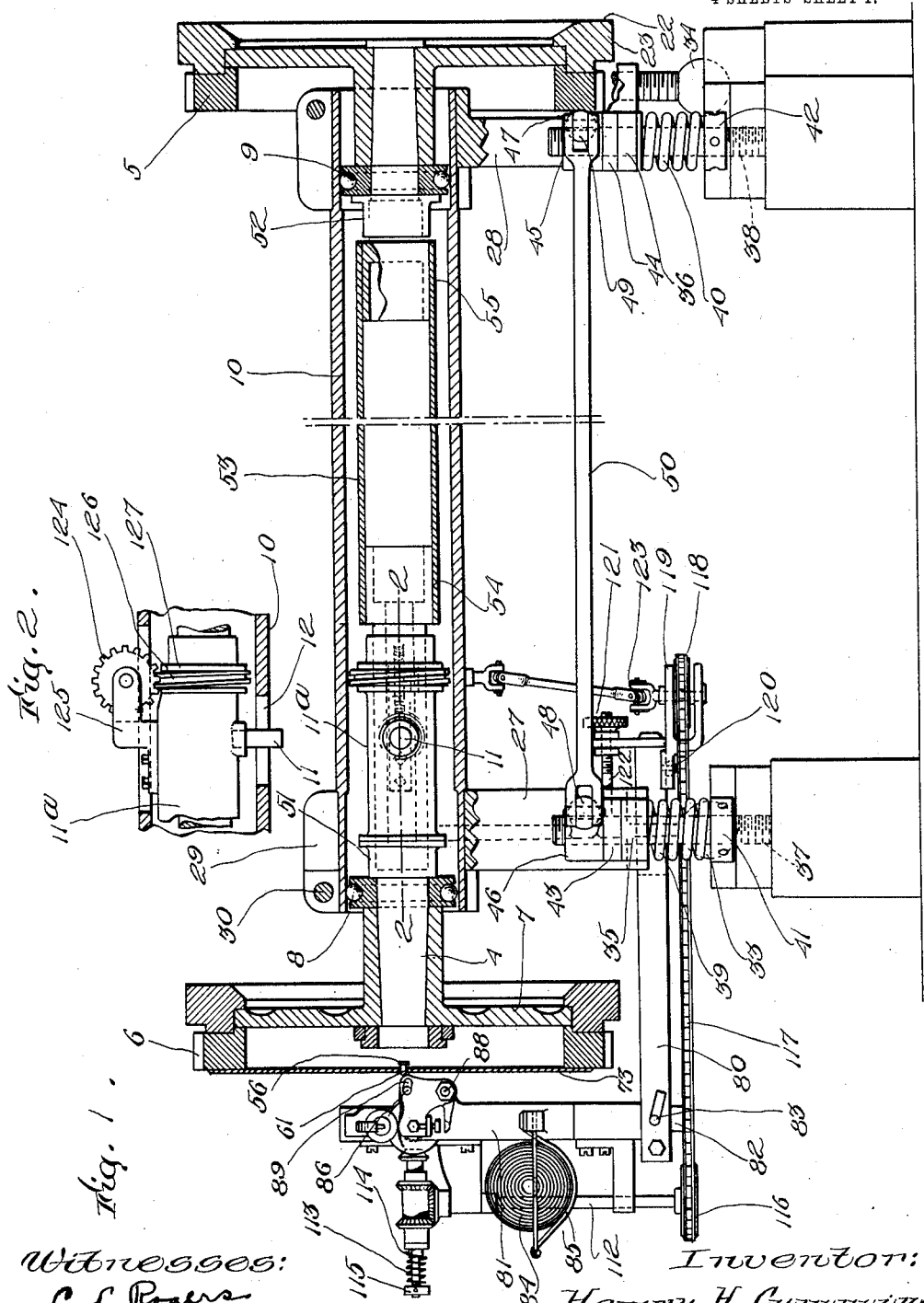

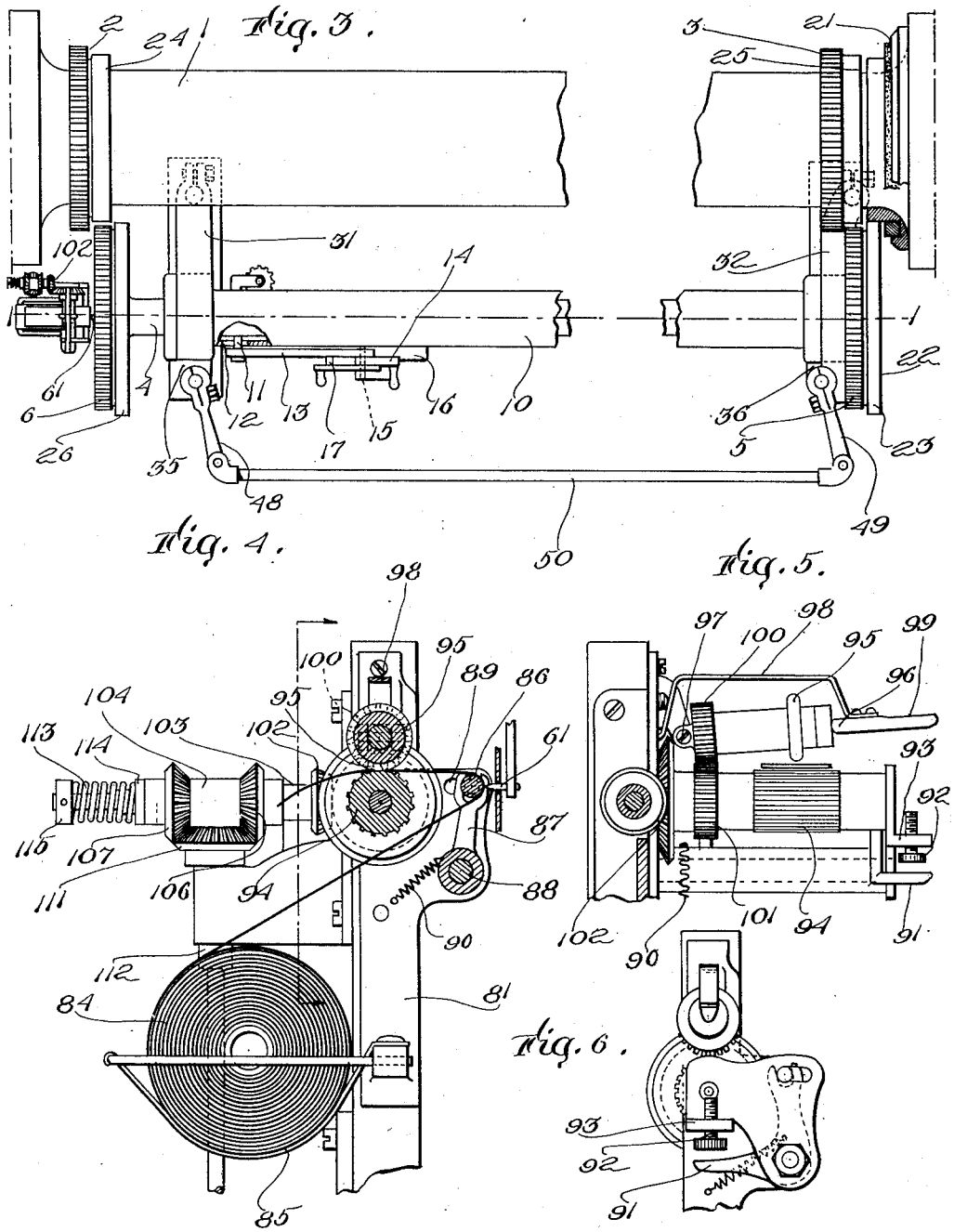
H. H. CUMMINGS.
APPARATUS FOR MEASURING THE TWIST OF SHAFTS.
APPLICATION FILED NOV. 22, 1911.
1,100,691. Patented June 16, 1914.
4 SHEETS—SHEET 2.

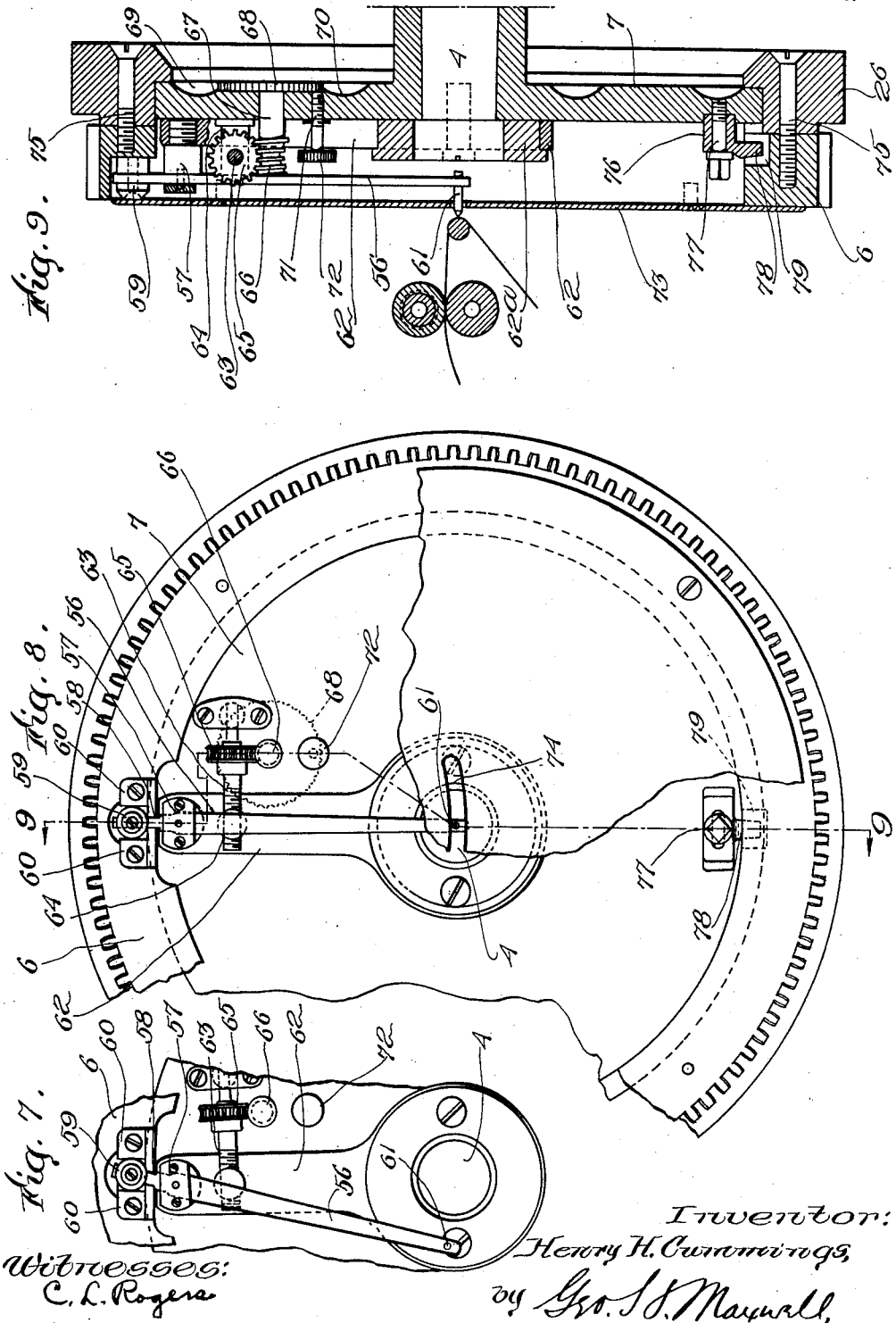

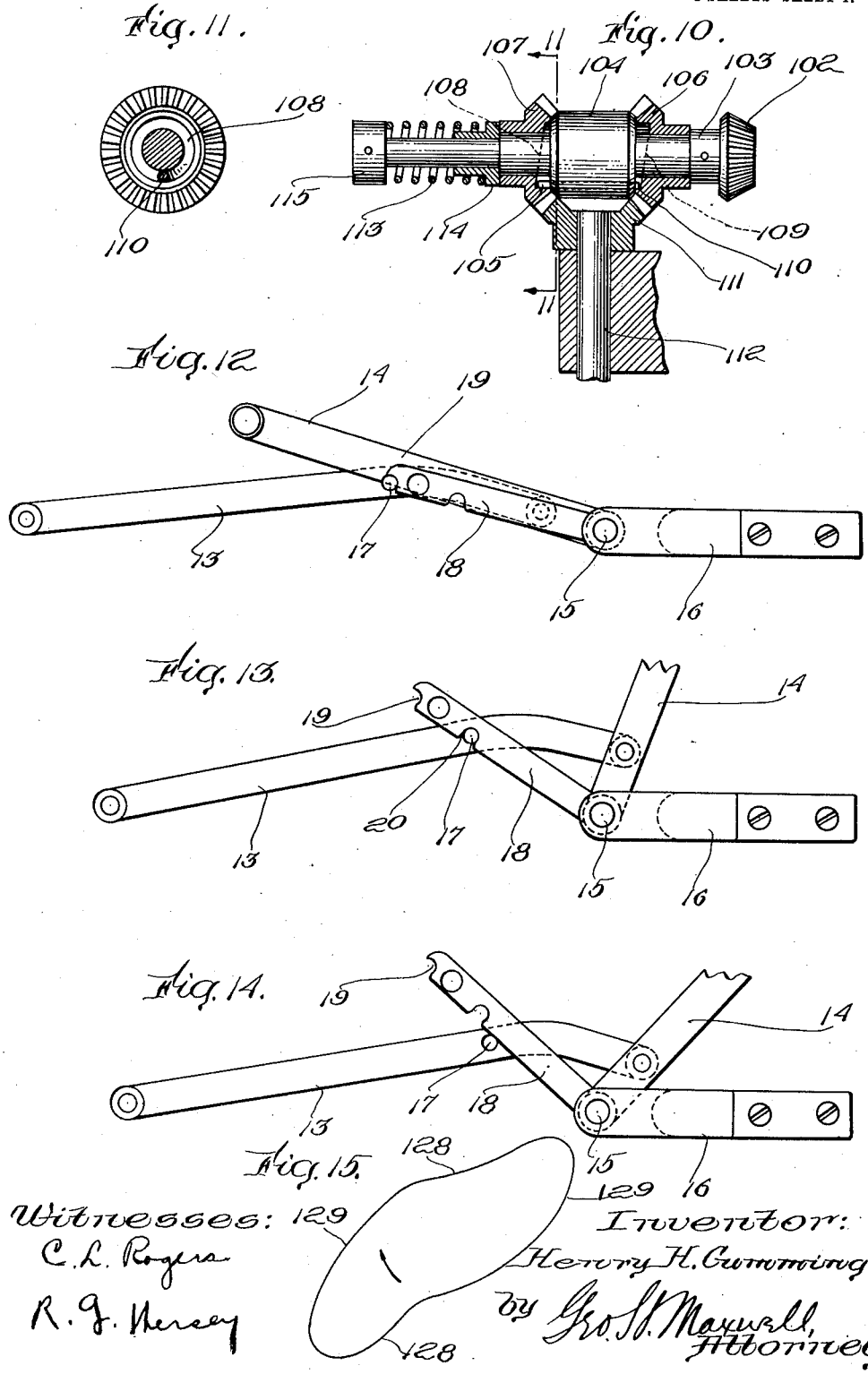

HENRY H. CUMMINGS, OF NEWTON HIGHLANDS, MASSACHUSETTS, ASSIGNOR OF ONE-HALF TO HOWLAND R. GARY, OF ALEXANDRIA, VIRGINIA.

APPARATUS FOR MEASURING THE TWIST OF SHAFTS.

1,100,691. Specification of Letters Patent. Patented June 16, 1914.

Application filed November 22, 1911. Serial No. 661,795.

*To all whom it may concern:*

Be it known that I, HENRY H. CUMMINGS, a citizen of the United States, and resident of Newton Highlands, county of Middlesex, and State of Massachusetts, have invented an Improvement in Apparatus for Measuring the Twist of Shafts, of which the following description, in connection with the accompanying drawings, is a specification, like letters on the drawings representing like parts.

This invention relates to apparatus adapted to measure the driving impulse of turbines, or other rotary engines, by means of the twist on a transmission shaft to the part to be driven.

While the invention has other and more general fields of usefulness, it is especially adapted for use on turbine driven ships, since it permits a measurement of the horse power being delivered by the engines whenever desired, without stopping the propellers or in any way affecting the drive thereof.

More particularly, the invention consists in a device adapted to exactly measure the driving impulse from such an engine, while the turbine and the propeller or other mechanism driven thereby are in operation, without in any way disturbing the drive or the introduction of any complication or additional elements in the driving connections.

The elastic torsion differential between separated parts of the power transmitting shaft by means of the novel multiplying devices set forth, is arranged to operate a recorder, and as the high grade steel of such shafting is almost perfectly elastic, the recording device is correspondingly accurate and non-varying in its showing of the variations in the twist or torque to which such shaft section is subjected, and the horse power being delivered at any particular time can be quickly ascertained from the integrating record produced by the recording device, in connection with a pre-determined constant.

The invention will be more fully understood from the following detailed description, taken in connection with the accompanying drawings, and will be thereafter pointed out in the appended claims.

Referring to the drawings: Figure 1 is an enlarged central longitudinal section on line 1—1 of Fig 3. Fig. 2 is a sectional detail on line 2—2 of Fig. 1. Fig. 3 is a plan view of the device applied to a driving shaft. Fig. 4 is a fragmentary side elevation partly in section of the paper feed and recording device. Fig. 5 is a fragmentary front elevation of the paper feed. Fig. 6 is a fragmentary view showing in side elevation a portion of the paper feeding devices. Fig. 7 is a fragmentary end view of the recording device. Fig. 8 is an end view partially broken away, showing the head gear and the manner of connection of the recording device therewith. Fig. 9 is a central vertical section on line 9—9 of Fig. 8. Fig. 10 is a detailed sectional side elevation enlarged, of a part of the driving gear for the paper feed. Fig. 11 is a transverse sectional view on line 11—11 of Fig. 10. Figs. 12, 13, 14, are side elevations showing different positions of the lever for throwing the device in to and out of operative position and the lock therefor. Fig. 15 is a diagrammatic view showing the manner in which the device is adapted to indicate the power delivered by a reciprocating engine.

A driving shaft transmitting power from the turbine to the propeller, or other driven element has an integral portion thereof, shown at 1. On this shaft portion, at separate points, gears 2, 3, shown as spur wheels, are rigidly fixed. These wheels should be spaced as far apart as may be found convenient, the exact distance being immaterial, the only requisite being that they be spaced far enough so that, as driving impulse is imparted through the shaft portion 1 between such wheels, there may be enough torque imparted to this shaft portion so that, when multiplied by the devices now to be described, it will make a readable showing on the recording sheet. A countershaft 4 extends alongside the shaft section 1 for the distance between the gears 2, 3 and this shaft carries gears 5, 6 at its opposite ends. The gear 5 is rigidly fixed at one end of this countershaft, while the gear 6 is yieldably mounted on a disk flange 7 on the other end of this shaft. The countershaft 4 carrying the gears 5, 6 is adapted to be slid lengthwise to throw said gears into mesh with the gears 2, 3 respectively, when it is desired to put the device into operation, and to this end the ball bearing cups 8, 9 adjacent the ends of said shaft are slidably fitted at the ends of a tubular casing 10, which constitute a support and protecting shield for said countershaft. As shown in Fig. 3, the shaft 4 is at the limit of its movement to the right and the device is inoperative, while as shown in Fig. 2 said shaft, with its bearings 8, 9, is moved to the left, i. e., to its operative position. To effect this endwise movement of countershaft 4, a pin 11 fixed to a sleeve 11ª projects laterally therefrom, this sleeve being held from endwise movement on the shaft between flange 51 and the side of the worm gear 126, later described, while permitting the shaft to rotate freely therein. This pin extends through a slot 12 of casing 10 and has connected thereto a link 13, having its other end pivotally connected for operation to a lever handle 14, fulcrumed at 15 to a bracket 16 fixed on the casing 10. This link 13 has a pin 17 fixed thereon for coöperation with a locking arm 18 shown as pivoted at the axis 15. This arm has an end notch 19, adapted to coöperate with the pin 17 as shown in Fig. 12, to hold the countershaft locked at the extreme left, or operative position, and an intermediate notch 20, adapted to engage said pin and hold the parts locked in inoperative position, with the gears out of mesh.

In throwing the gears 5, 6 into mesh with the gears 2, 3, when it is desired to set the device into operation, it is necessary, in view of the extremely high speed of the gears 2, 3, that a preliminary speeding up be imparted to the gears 5, 6. To this end, an annular friction member, shown as a ring 21 of leather, or the like, is fixed to a flange on the shaft portion 1 adjacent to the gear 3, and when the shaft 4 is given an extreme movement to the right, this friction annulus engages a lateral annular surface 22 on a ring 23 fixed to the gear 5. The annulus 21 may be slightly larger than the gears 2, 3, so that it will impart to the shaft 4 a speed slightly in excess of that to be imparted by the driving gearing; thus the small loss of speed resulting as the shaft 4 is shifted from this friction driving connection to the spur geared connection between gears 2—6 and 3—5 will result in an easy taking up of the drive by this gearing without serious shock or strain upon the parts. To further minimize shock, I also preferably form the driving gear at one end of the shaft portion 1 a little wider than at the other, this being shown in the gear 3, Fig. 3, so that one of the driven gears i. e., gear 5, as shown, will come into mesh with its driver a little before the gear 6 engages the gear 2. In Fig. 14 the extreme position of lever 14 to the right is illustrated, this lever being held manually in this position while the shaft 4 is picking up speed from the drive of the friction annulus 21. As soon as shaft 4 has attained its full speed, the handle 14 is quickly shifted to the left, thus throwing in the spur gear drive, and the parts being locked in this position while the record is being taken by the engagement of notch 19 at the end of arm 18 with pin 17 on the link 13. To further effect extreme accuracy in the record produced by the device and to insure that all vibratory variations in driving impulse on the shaft portion 1 shall produce an exact, definite effect in relative displacement between spur wheel 6 and disk flange 7, it is desirable that there be no backlash or lost motion in the spur wheel drives, and to this end the gears 2, 3 have fixed to the sides thereof rings 24, 25 with smooth peripheries adapted to engage and exert driving impulse on other rings fixed to the sides of gears 5, 6, that fixed to the gear 6 being shown at 26, while the ring 23 before referred to fixed to the side of the gear 5, coöperates with the ring 25. The driving rings 24, 25 are slightly smaller than the pitch diameter of the spur gears to which they are fixed, and hence tend to rotate the driven rings at a slightly less speed than that positively imparted by the spur wheel drive, the result of this arrangement being that the engaging spur teeth of the driving and driven wheels at each end are always held in pressing engagement on one side so that any small looseness between the spur teeth will not result in back-lash or produce any inaccuracy in the results upon the recording device.

It is desirable that as the described endwise adjustment of shaft 4 to operative position takes place, the gears and friction rings should not be in the close engaged position which they occupy when the device is operating, and I therefore provide means for moving the shaft 4 radially toward the shaft portion after its endwise movement to active position. As a convenient means to this end, the tube casing 10 is mounted at its ends in brackets 27, 28, this mounting being shown as by means of embracing ears 29 at the tops of these brackets adapted to be gripped to the circumference of casing 10 by screw bolts 30. The brackets 27, 28 have inwardly projecting portions 31, 32 pivotally secured at 33, 34 to a convenient fixed base. As shown, the pivots 33 34 are formed as ball-and-socket joints to permit universal adjustment for proper alinement of the parts within small limits. The brackets 27, 28 have outwardly projecting arms or ears 35, 36 with apertures therein through which vertically extend threaded rods 37, 38 suitably fixed to a base support. The ears 35, 36 are slidable on these rods and are normally pressed upward by springs 39, 40 to swing the gears 5, 6 into close engaging position. These springs are shown as encircling the rods 37, 38 and as having backing on nuts 41, 42 adjustably threaded on said rods so that the active force of said springs can be regulated as desired. To hold the ears 35, 36 downward against the pressure of the springs, nuts 43, 44 are threaded on the rods 37, 38 above said ears, these nuts having sleeves 45 upwardly projecting therefrom for engagement by embracing clamps 46, 47 having fixed thereto operating handles 48, 49. These handles may be pivotally connected to the ends of a rod 50 for simultaneous operation. Thus the shaft 4 may be moved lengthwise to operative position for actuation of the lever 14, while the nuts 43, 44 are turned down to hold said shaft away from the shaft portion 1, and when the gears are in endwise alinement for driving, a movement of the rod 50 will turn up the nuts 43, 44 and permit the springs to press the friction disks and gears into close engagement. The shaft 4 may be provided with any usual or desired type of ball bearings, operative in the ball casings 8, 9, which are held to slide endwise therewith, being held in place between the wheel flanges and suitable flange collars 51, 52 fixed on the shaft. Since the shaft 4 is protected from injury, as stated, by the tubular casing 10 extending through the length thereof, and since this shaft has no considerable torsional strain to withstand, I preferably lighten the construction by leaving out the intermediate portion of this shaft and connecting the ends to a tubular sleeve 53, the shaft ends being, as shown, brazed to the ends of this sleeve at 54, 55.

It may now be understood that when the shaft portion 1 is driven from one end and encounters no resistance at its other end, the gears 2, 3, will rotate in exactly the same time and will drive the gears 5, 6 synchronously, so that there will be no relative displacement between the disk flange 7 and the gear 6. When, however, the turbine is working under normal load and the shaft portion 1 is transmitting driving impulse to the propeller, or other driven element, there will be a slight elastic twisting distortion in the shaft portion 1 between the gears 2 and 3, and, as the former positively drives the gear 6, and the latter, through rigid connections, drives the flange disk 7, it is apparent that the result of this elastic distortion in shaft portion 1 will appear in a relative angular displacement between the gears 6 and the flange disk 7, and that this displacement will correspond to the amount of elastic distortion of the shaft portion 1, the extent of such distortion (within the elastic limits) being in turn exactly dependent upon the amount of energy delivered. As a means to magnify the displacement between disk 7 and gear 6 thus produced and register the same, I provide an indicating arm 56 having a pivotal bearing at 57 on the outer face of disk 7 adjacent the periphery thereof. This arm has a short extension 58 projecting outward from the pivotal point and carries a roller 59 fitted between blocks 60 fixed on the outer face of gear 6 near its periphery. The main portion of the arm 56 extends radially inward and carries a registering stylus 61, which, at the zero point, is at the center of the gear. To attain accuracy in the initial centering of this stylus, the pivot bearing 57, instead of being fixed directly to the face of disk 7, may be fixed to an arm 62 angularly adjustable about a hub 62$^a$ projecting from the disk axis and adapted to be brought to exact position for centering the stylus 61 by means of a screw bolt 63 threaded to a swivel nut 64 carried by said arm. This screw bolt is mounted in bearings on the face of the disk and is actuated by a worm wheel 65 fixed thereon from a worm 66 on a shaft 67 extended through the disk to which is fixed a knurled disk 68 for hand operation on the face of disk flange 7. The flange disk 7 has annular finger grooves 69, 70 formed therein and the knurled disk 68 projects over slightly into each of these grooves so that by placing the finger in one or the other of these grooves the stylus 61 may be adjusted as described, while the parts are rotating, since at each revolution of disk 7 knurled disk 68 will be given a small movement one way or the other, depending on whether the finger is pressed in groove 69 or 70. When properly adjusted, the knurled disk 68, and hence the stylus, may be locked in position by a threaded pin 71, having a head 72 projecting for convenient operation and adapted to be screwed through the disk flange 7 to engage and grip the disk 68, as shown in Fig. 9. The arm 62 and its adjusting support is conveniently housed within the gear 6, which is shown as annular, and a cover plate 73 may be fixed to the face of this gear with a curved slot 74 therein to permit the projection of the stylus 61 in its several positions therethrough, while protecting the indicating arm and its adjusting devices from accident or injury. The flange disk 7 which has been described as yieldable with reference to the annular gear 6, is preferably held in assembled relation thereto, being held in a seat formed therefor between gear 6 and its smooth ring 26, these being held together as by screw bolts 75. To aid in setting and adjusting the parts within the proper limits, a lug 76 may be adjustably clamped to the disk flange 7 by means of a screw bolt 77, this lug having a projection 78 extending into a recess 79 in the gear 6, this recess being long enough to permit play of said projection therein resulting from the normal displacement of the parts in operation. The gear 5 and ring 23 at the other end of shaft 4 are shown as mounted upon said shaft in a somewhat similar manner, but in this case the drive is made positive from the gear to the shaft by suitable connections, shown as interlocking pins.

A suitable device is provided for continuously and evenly feeding a sheet of paper past the stylus 61 while the device is in operation to produce an integrating record of the extent and variations of torque on the driving shaft portion 1. As shown, this paper feed is mounted upon a bar 80, fixed to and projecting horizontally forward from the bracket 27. The feeding devices are carried by a vertical standard 81 having a reduced lower end 82 removably socketed in a recess at the end of the bar 80 and adapted to be locked in place as by a tapered pin 83, passed transversely through registering apertures in said members, this pin having a projecting handle as shown, so that it can be adjusted in tightly to hold the parts rigidly together. The paper may be fed from a roll 84 resting in a suitable holder 85 therefor, fixed to the standard 81 and passing around a roller 86 held in position opposite the stylus on arms 87 mounted to oscillate about an axis 88 on the standard 81. The oscillation of the roller 86 is limited by a short curved slot 89 formed near the top of standard 81 in which its ends engage. The roller 86 is normally held at the limit of its movement away from the stylus 61 by a spring 90 fixed to arm 87 and to the standard 81, as shown, and is adapted to be swung toward the stylus to recording position by a finger piece 91 fixed to and projecting laterally from one of the arms 87, the extent of movement toward the stylus being suitably regulated by a stop 92 threaded through a lug 93 on the support. The paper is drawn over the roller 86 by feed wheels 94, 95 the former being mounted in fixed bearings on the standard, and cylindrical in form with a knurled periphery, while the wheel 95 is shown as a disk mounted on a swinging arm 96 pivoted at 97 to the standard and normally swung upward to hold the disk 95 away from the paper by a spring 98. This arm has an extension 99 constituting a thumb piece, which may be engaged by the thumb to press down the disk 95, so as to cause the paper to feed at the same time that a finger engages the finger piece 91 to swing the roller 86 to operative position. The feed wheel 95 is journaled for rotation along with a gear 100 on arm 96 and this gear is driven by a gear 101 fixed for rotation with roller 94 and driven by beveled gearing 102 from a shaft 103, suitably journaled at the top of the standard 81. The shaft 103 has fixed for rotation thereon a spool 104 with a pin 105 slidable lengthwise through and somewhat longer than said spool, so as to project from an end thereof. Beveled pinions 106, 107 are rotatably mounted on shaft 103 at the opposite ends of the spool 104, these facing toward each other and being provided with cam portions 108, 109 cut out in opposite directions providing oppositely facing clutch shoulders, one of which is shown at 110 in Fig. 11. The pinions 106, 107 are placed in geared connection with a driving pinion 111 fixed on a vertical shaft 112 journaled in the support. They are hence constantly driven in opposite directions and one of them is always clutched to the shaft by engagement of a shoulder as 110 with the projecting end of pin 105. Upon a reversal of the direction of movement of driving shaft 112,—which is connected with the propeller shaft and hence reversed therewith,— the cam surface as 108 of the pinion 107 which has before been driving shaft 103, will engage the end of pin 105 and slide it lengthwise through the spool 104 so that it will project from the other end thereof and be engaged by the clutch shoulder on the other pinion 106, which will then drive the shaft 103, thus effecting a constant drive of said shaft 103, in the same direction and hence a uni-directional paper feed, whatever the direction of the drive therefor from the propeller shaft. Provision for endwise yielding movement of pinion 107 is made by the interposition of a spring 113 between a flanged collar 114 engaging the end of said pinion and a backing 115 formed on the end of shaft 103. As a convenient means for driving the shaft 112, it may have a spurwheel 116 fixed on the lower end thereof driven by a sprocket-chain 117 from a sprocket wheel 118 journaled in a bracket 119 adjustably fixed, as shown, at 120 to the inner end of bar 80. This bracket is adjustable to vary the tension of sprocket-chain 117 by mean of a hand nut 121 threaded on a screw bolt 122 projecting from bracket 27, said nut engaging an upright extension on bracket 119 as shown. The sprocket wheel 118 is driven by a jointed shafting 123 from a worm wheel 124 fixed to an end of said shafting which is journaled in a bracket 125 fixed to the sleeve 11ª. The worm wheel 124 is driven from a worm gear 126 fixed with a flanged collar 127 on the shaft 4.

In use, the device may be mounted in any convenient position where a sufficient length of the driving shaft is available for the proper spacing apart of the gear wheels 2, 3. The mechanism in its normal inactive position, as shown in Fig. 3, is housed and protected for most of its length by the casing 10, which extends over most of the length of the counter-shafting 4; thus the device extending alongside the shaft 1 takes up little room and in no way interferes with the drive of the propeller shaft. When it is desired to take a reading of the power being transmitted to the propeller by the turbine, the handle 14 is unlocked and the shaft 4 is first thrown to the right so as to speed up said shaft by means of the friction ring drive 21, then the lever is thrown to the left, bringing gears on shaft 4 into engagement with the driving gears on shaft portion 1, this engagement taking place without shock, since the gears 5, 6 are already rotating substantially at the same rate as gears 2, 3. The rod 50 is now operated to permit the mounting of shaft 4 to swing inward under the influence of springs 39, 40 pressing the smooth rings 23, 26 into similar engagement with the rings 24, 25, thus causing the gear teeth to stay crowded up against one side all the time they are running, the smooth surfaces of the rings slipping slightly and thus taking up all lost motion or back-lash whether running forward or backward. Since the stylus has its zero point at the axis of rotation of its carrier, any variation from said axis will be recorded twice in each revolution on each side of the center, and thus the record it registers is twice as wide as the actual deflection of the stylus. The mounting of the stylus enables it to be controlled very simply and still give a record sufficiently magnified to be accurately and easily read. Should the stylus need adjusting to the zero position, this can be quickly done while the parts are in motion by placing the finger in one or the other of the annular grooves 69, 70 to engage the knurled disk 68 as it revolves until the exact adjustment is obtained. This positioning of the stylus at the axis of rotation for the zero point is also important in reducing to a minimum the centrifugal effect of high rotative speed, since at or near the center the centrifugal tendency is relatively low. Further, this arrangement with the stylus and its carrying and adjusting parts within the gear ring 6 makes the whole device very compact and well protected. By reason of the arrangement of clutch devices in connection with beveled gears 106, 107 the paper sheet is fed continuously forward in one direction without any manual intervention whether the engine be running forward or backward. From the record sheet thus produced the horse power being delivered by the turbine at any particular time can be instantly determined by means of a pre-arranged table which may be made up from preliminary testings as to the elastic distortion coefficient of the shaft portion 1 employed. The device may also be used to show diagrammatically the power delivered by a reciprocating engine when such an engine is used as the driver for shaft portion 1, this result being attained by removing the paper feed device and holding a sheet up in front of the stylus in any suitable manner, when a diagram similar to that shown in Fig. 15 will be produced from which the power exerted by the engine in the different parts of its cycle of movement can be determined. In this diagram the inwardly curved portion 128 and the outwardly curved portions 129 of the continuous line showing the cycle of power impulses, indicate the variations of power transmission from the initial live steam admission, through the period of expansion when the live steam is cut off. The device is composed of a relatively small number of positively acting elements and since the transmission shaft usually employed between the turbine and propeller is proportioned so as to suffer no permanent distortion in use, i. e., it is never strained beyond its elastic limit, it follows that a high degree of accuracy is attainable in the record produced.

Having described my invention, what I claim as new and desire to secure by Letters Patent is:

1. Apparatus of the kind described, comprising adjacently disposed rotatable members, connections for driving said members from separated portions of transmission shafting, a recording element carried by one of said rotatable members and engaged by the other and having its record making portion normally concentric with the member by which it is carried and variable from such concentric position in making its record, and a record receiving member in position to be engaged by said recording element.

2. Apparatus of the kind described, comprising two rotatable concentric adjacently disposed members, connections for driving said members from separated portions of power transmission shafting, a recording element carried by one of said members and engaged by the other thereof, and a record receiving member in position to receive a record made by said recording element, the record making portion of said recording element being normally concentric with said rotatable members and variably movable from such concentric position in making its record.

3. Apparatus of the kind described, comprising two rotatable concentric members, connections for driving said members from separated portions of transmission shafting, an arm having a recording device fixed thereto pivotally carried by one of said members and engaged by the other member, said recording device being normally concentric with said rotatable members, and means arranged to provide for adjustment of the position of said recording device and variably movable from such concentric position for making its record, while said rotatable members are in movement.

4. Apparatus of the kind described, comprising two rotatable concentric members, connections for driving said members from separated portions of transmission shafting, an arm having a recording device fixed thereto pivotally carried by one of said members and engaged by the other member, said recording device being normally concentric with said rotatable members, and connections adapted to be engaged by an operator while the apparatus is in motion for effecting definite adjustments of said recording device.

5. Apparatus of the kind described, comprising coacting members normally moving together, but having relatively small differential movement for recording purposes, a recording device coöperatively controlled by said members, and connections arranged to be engaged by the hand of an operator for definitely adjusting the position of said recording device while the apparatus is in motion.

6. Apparatus of the kind described, comprising concentric rotatable members, a recording device carried by one of said members and engaged by the other, the recording portion of said device being normally concentric with said members, and a record receiving member mounted in position to be engaged by said recording device.

7. In an apparatus of the kind described, gears fixed to separated parts of a power transmission shafting, a counter-shaft extending alongside said shafting, having a gear fixed thereto and a gear loose thereon, said gears being respectively driven by the gears on the power transmission shafting, and a motion multiplying device connected with said loose gear and with said counter-shaft to register variations in the movements thereof.

8. In an apparatus of the kind described, gears rigidly fixed at separated points to a rigid power transmission shaft, a shaft mounted adjacent said power transmission shaft and carrying a fixed gear and a loose gear, said gears being respectively driven by the gears on said power transmission shaft, an indicating arm connected to said loose gear and to said shaft and carrying a stylus, and means for holding a record sheet in position to be engaged by said stylus.

9. In an apparatus of the kind described, gears rigidly fixed to separated portions of a power transmission shaft, other gears driven by said gears respectively and mounted for individual rotation, means for preventing back-lash between said gears, and a motion multiplying device carrying a stylus connected with the driven gears and adapted to register relative variations in movement thereof.

10. In an apparatus of the kind described, gears rigidly fixed at separated points to a power transmission shaft and having smooth disks fixed alongside thereof, a counter-shaft having a fixed gear and a loose gear meshing with said power transmission shaft gears, said last named gears having smooth disks adapted to engage with those on the first named gears, a registering device connected with the loose gears and with said counter-shaft, and means for yieldingly pressing said disks into engagement, said disks being proportioned to exert a driving tendency at a different rate from said gears whereby back-lash in the gear drive is prevented.

11. In an apparatus of the kind described, gears fixed to a rigid section of a power transmission shafting at separated points, a counter-shaft extending adjacent said shafting and carrying a fixed gear and a loose gear meshing with the first named gears respectively, an indicating device connected with said loose gear and said counter-shaft, and means for relatively moving the parts to throw the indicating device in to or out of operation at will.

12. In an apparatus of the kind described, gears rigidly fixed to a power transmission shaft at separated points, a counter-shaft mounted alongside said transmission shaft carrying a fixed gear and a loose gear meshing respectively with said transmission shaft gears, an indicating device connected with said loose gear and with said counter-shaft, and means for moving said counter-shaft and its gears endwise to put the device in to or out of operation.

13. In an apparatus of the kind described, gears rigidly fixed to a power transmission shaft at separated points, a counter-shaft carrying a fixed gear and a loose gear meshing with said transmission shaft gears respectively, disks mounted adjacent said gears and exerting a driving tendency at a different rate from the drive imparted by said gears, means for moving said counter-shaft to throw the gearing in to or out of connection at will, and means for yieldingly pressing said disks into engagement with the gearing in operative position.

14. Apparatus of the kind described, comprising rotatable members having connections to be normally moved together by impulses from separated portions of transmission shafting, and for relatively small differential movement due to variations in power transmission through such shafting, a recording device having connections for mutual control by said members, said connections being arranged to cause the record making element of said device to move in opposite directions from a neutral point to record power transmission in opposite directions, and a record receiving member connected with one of said rotatable members to be driven in definitely timed relation thereto.

15. Apparatus of the kind described, comprising rotatable members having geared connections to separated portions of transmission shafting, a recording device mutually controlled by said members, and a mounting for said members constructed and arranged to move them into driving engagement with said shafting, or out of driving engagement at will.

16. Apparatus of the kind described, comprising rotatable members having both frictional and positive geared connections to separated portions of transmission shafting, an indicating device mutually controlled by said members, and means arranged to provide for movement of said members to first bring said frictional connections into operation, and thereafter to bring said positive geared connections into operation.

17. Apparatus of the kind described, comprising rotatable members having positive driving connections from separated portions of transmission shafting, an indicating device mutually controlled by said members, means for moving said members to bring said geared driving connections into or out of operation at will, and means to effect a preliminary speeding up of said members preparatory to the engagement of said positive driving connections.

In testimony whereof, I have signed my name to this specification, in the presence of two subscribing witnesses.

HENRY H. CUMMINGS.

Witnesses:
C. L. ROGERS,
H. R. GARY.

Copies of this patent may be obtained for five cents each, by addressing the "Commissioner of Patents, Washington, D. C."